US012759490B2

(12) United States Patent
Tsukamoto et al.

(10) Patent No.: US 12,759,490 B2
(45) Date of Patent: Oct. 13, 2026

(54) CONTROL DEVICE AND VEHICLE

(71) Applicant: TOYOTA JIDOSHA KABUSHIKI KAISHA, Toyota (JP)

(72) Inventors: Akifumi Tsukamoto, Toyoake (JP); Takahiro Ishii, Toyota (JP); Ryo Sugiyama, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/062,667

(22) Filed: Feb. 25, 2025

(65) Prior Publication Data

US 2025/0269810 A1 Aug. 28, 2025

(30) Foreign Application Priority Data

Feb. 28, 2024 (JP) ................................ 2024-028598

(51) Int. Cl.
*B60R 16/023* (2006.01)
*B60R 16/037* (2006.01)
*B60K 35/10* (2024.01)

(52) U.S. Cl.
CPC ........ *B60R 16/037* (2013.01); *B60R 16/0237* (2013.01); *B60K 35/10* (2024.01)

(58) Field of Classification Search
CPC ...... B60K 35/10; B60R 16/037; B60R 16/023
(Continued)

(56) References Cited

U.S. PATENT DOCUMENTS 7,684,570 B2 * 3/2010 Riggs .................. G11B 19/027 710/63
7,880,594 B2 * 2/2011 Breed ................ B60C 23/0408 340/459

(Continued)

FOREIGN PATENT DOCUMENTS

BR 8306689 A * 11/1984 ............. B60K 35/80
CN 106997223 A * 8/2017 ........... G06F 1/1613

(Continued)

OTHER PUBLICATIONS

Balakrishnan, Sakthi Abirami, Esther Florence Sundarsingh, and Vimal Samsingh Ramalingam. "Conformal microwave sensor for enhanced driving posture monitoring and thermal comfort in automotive sector." IEEE Journal of Electromagnetics, RF and Microwaves in Medicine and Biology 8.4: 355-362. (Year: 2024).*

(Continued)

*Primary Examiner* — Cuong H Nguyen
(74) *Attorney, Agent, or Firm* — Oliff PLC

(57) ABSTRACT

A control device that controls operation devices mounted in a vehicle includes a memory and a processor. The memory stores a mode setting value set. In the mode setting value set, information indicating a length of a first period, information indicating an operation device that is the target to be operated during the first period, information indicating an operation content of the operation device that is the target to be operated during the first period, information indicating an operation device that is the target to be operated during a second period following the first period, and information indicating an operation content of the operation device that is the target to be operated during the second period are determined corresponding to each mode. The processor executes the control based on the information corresponding to each mode.

6 Claims, 5 Drawing Sheets

(58) Field of Classification Search
USPC .............................................................. 701/36
See application file for complete search history.

(56) References Cited

U.S. PATENT DOCUMENTS

| | | | | |
|---|---|---|---|---|
| 2005/0052426 | A1* | 3/2005 | Hagermoser ........ | H03K 17/962 345/173 |
| 2014/0310610 | A1* | 10/2014 | Ricci ..................... | G06F 16/951 715/744 |
| 2022/0151450 | A1* | 5/2022 | Case ...................... | B25J 13/003 |
| 2023/0302966 | A1 | 9/2023 | Suzuki et al. | |

FOREIGN PATENT DOCUMENTS

| | | | | | |
|---|---|---|---|---|---|
| CN | 111902699 | B | * | 7/2024 | ............. B60K 35/28 |
| DE | 102004015562 | A1 | * | 11/2004 | ........... B60R 16/027 |
| DE | 102005007865 | B4 | * | 6/2007 | ............. B60K 35/10 |
| JP | 2023-093003 | A | | 7/2023 | |
| JP | 7567695 | B2 | * | 10/2024 | ............... B62D 1/14 |

OTHER PUBLICATIONS

Park, Yangkyu, et al. “Heater-integrated flexible piezoresistive pressure sensor array for smart-car seats.” IEEE Sensors Journal 24.2: 1255-1263. (Year: 2023).*

Xu Q, Wang B, Zhang F, Regani DS, Wang F, Liu KR. Wireless AI in smart car: How smart a car can be ?. IEEE Access. Mar. 5, 2020;8:55091-112.*

Sobotka, Jan, Jiří Novák, and Jiří Pinkava. “Modified vehicle architecture for rapid prototyping.” Acta IMEKO 13.4: 1-6. (Year: 2024).*

Murali, Prajval Kumar, Mohsen Kaboli, and Ravinder Dahiya. “Intelligent in-vehicle interaction technologies.” Advanced Intelligent Systems 4.2 (2022): 2100122. (Year: 2022).*

An English version of CN111902699B by Sumitomo Wiring Systems Ltd. (Year: 2024).*

* cited by examiner

FIG. 2

MS

| MODE | OPERATION DEVICE | FIRST PERIOD | SECOND PERIOD | THIRD PERIOD | FOURTH PERIOD |
|---|---|---|---|---|---|
| FIRST MODE | PERIOD LENGTH | a | b | c | d |
| | FIRST OPERATION DEVICE | AA | AB | AC | AD |
| | SECOND OPERATION DEVICE | BA | BB | BC | BD |
| | THIRD OPERATION DEVICE | CA | CB | CC | CD |
| | FOURTH OPERATION DEVICE | DA | DB | DC | DD |
| SECOND MODE | PERIOD LENGTH | f | g | h | i |
| | FIRST OPERATION DEVICE | AF | AG | AH | AI |
| | SECOND OPERATION DEVICE | BF | BG | BH | BI |
| | THIRD OPERATION DEVICE | CF | CG | CH | CI |
| | FOURTH OPERATION DEVICE | DF | DG | DH | DI |

FIG. 3

MS

| MODE | OPERATION DEVICE | FIRST TIMING | SECOND TIMING | THIRD TIMING | FOURTH TIMING |
|---|---|---|---|---|---|
| FIRST MODE | PERIOD LENGTH | aa | ab | ac | ad |
| | FIRST OPERATION DEVICE | AAa | AAb | AAc | AAd |
| | SECOND OPERATION DEVICE | BAa | BAb | BAc | BAd |
| | THIRD OPERATION DEVICE | CAa | CAb | CAc | CAd |
| | FOURTH OPERATION DEVICE | DAa | DAb | DAc | DAd |

FIG. 6

MS

| FUNCTION | TARGET DEVICE | OPENING | | | | MAIN | | | | PRE-END | | | | MODE END | | | |
|---|---|---|---|---|---|---|---|---|---|---|---|---|---|---|---|---|---|
| | | 1 | 2 | 3 | 4 | 1 | 2 | 3 | 4 | 1 | 2 | 3 | 4 | 1 | 2 | 3 | 4 |
| BGM | AUDIO DEVICE | START MODE | · | · | · | MAIN MODE | · | · | · | PRE-END MODE | · | · | · | END MODE | · | · | · |
| SHADE | SHADE DEVICE | STORAGE | OPEN STATE | · | · | · | · | · | · | · | · | · | · | RETURN | · | · | · |
| DIMMING | DIMMING DEVICE | STORAGE | DIMMING MODE | · | · | · | · | · | · | · | · | · | · | RETURN | · | · | · |
| AIR CONDITIONING | AIR CONDITIONING DEVICE | STORAGE | AUTO MODE | · | · | ADJUSTMENT | · | · | · | · | · | · | · | RETURN | · | · | · |
| RECLINING | SEAT DEVICE | STORAGE | START POSITION | · | · | SPECIFIED POSITION | · | · | · | · | · | · | · | RETURN | · | · | · |
| ILLUMINATION | VEHICLE CABIN ILLUMINATION DEVICE | STORAGE | FADE-IN | · | · | MAIN ILLUMINATION | · | · | · | PRE-END MODE | · | · | · | END MODE | NOTIFICATION | FADE-OUT | RETURN |

CONTROL DEVICE AND VEHICLE

CROSS-REFERENCE TO RELATED APPLICATION

This application claims priority to Japanese Patent Application No. 2024-028598 filed on Feb. 28, 2024. The disclosure of the above-identified application, including the specification, drawings, and claims, is incorporated by reference herein in its entirety.

BACKGROUND

1. Technical Field

The present disclosure relates to a control device and a vehicle.

2. Description of Related Art

Japanese Unexamined Patent Application Publication No. 2023-093003 (JP 2023-093003 A) discloses a control device that controls a seat device as an operation device in a relax mode.

SUMMARY

The control device may set a first mode in which two or more operation devices are used as control targets and a second mode different from the first mode, in order to achieve a vehicle cabin environment of a vehicle. However, for the control device as disclosed in JP 2023-093003 A, designing a control flow of a plurality of operation devices for each mode may impose an excessive burden on a developer. The operation device as the control target of the control device is not limited to the seat device, and the same situation occurs even when another operation device is the control target.

An aspect of the present disclosure relates to a control device that controls a plurality of operation devices mounted in a vehicle, the control device including: a memory; and a processor. The memory is configured to store a mode setting value set indicating, corresponding to each of a first mode and a second mode for achieving a vehicle cabin environment of the vehicle, information indicating a length of a first period, information indicating at least two operation devices that are targets to be operated during the first period among the operation devices, information indicating an operation content of each operation device of the at least two operation devices that is the target to be operated during the first period, information indicating at least two operation devices that are targets to be operated during a second period following the first period among the operation devices, and information indicating an operation content of each operation device of the at least two operation devices that is the target to be operated during the second period. The information corresponding to the first mode in the mode setting value set is at least partially different from the information corresponding to the second mode in the mode setting value set. The processor is configured to, when control is executed in the first mode, based on the information corresponding to the first mode in the mode setting value set, start control of the first period for the at least two operation devices that are targets to be operated during the first period with the operation content of each operation device of the at least two operation devices that is the target to be operated during the first period, and start control of the second period for the at least two operation devices that are targets to be operated during the second period with the operation content of each operation device of the at least two operation devices that is the target to be operated during the second period when the length of the first period has elapsed from the start of the control of the first period, and when control is executed in the second mode, based on the information corresponding to the second mode in the mode setting value set, start control of the first period for the at least two operation devices that are targets to be operated during the first period with the operation content of each operation device of the at least two operation devices that is the target to be operated during the first period, and start control of the second period for the at least two operation devices that are targets to be operated during the second period with the operation content of each operation device of the at least two operation devices that is the target to be operated during the second period when the length of the first period has elapsed from the start of the control of the first period.

With the above-described configuration, in a case where the control is executed in each of the first mode and the second mode, the control in each mode can be executed in the same control flow by determining the information corresponding to each mode. Therefore, in achieving the control in the modes, an excessive increase in a burden imposed on a developer can be suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a diagram showing a mode setting value set;

FIG. 3 is a diagram showing details of a mode setting value set in a first period in a first mode;

FIG. 6 is a diagram showing a specific example of the mode setting value set.

DETAILED DESCRIPTION OF EMBODIMENTS

First Embodiment

Hereinafter, an embodiment of a control device and a vehicle will be described with reference to the drawings.

Outline of Vehicle

Figure 1:
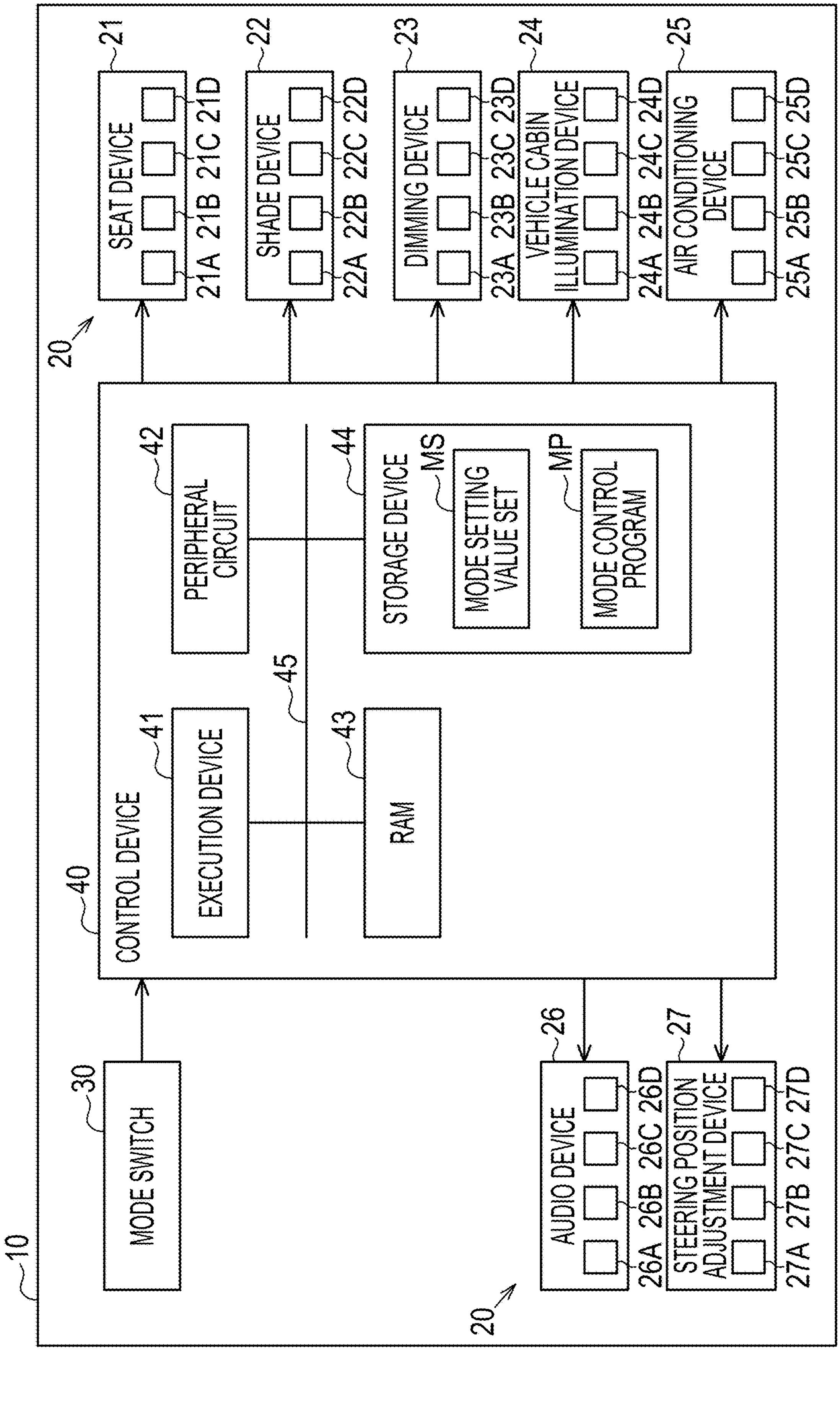
FIG. 1 is a schematic diagram showing a vehicle.

As shown in FIG. 1, a vehicle 10 includes a plurality of operation devices 20. That is, the operation devices 20 are mounted in the vehicle 10. The operation device 20 is a device that affects a vehicle cabin environment of the vehicle 10 when the operation device 20 operates.

The operation devices 20 include a seat device 21, a shade device 22, a dimming device 23, a vehicle cabin illumination device 24, an air conditioning device 25, an audio device 26, and a steering position adjustment device 27.

The seat device 21 affects a posture of an occupant while the occupant is getting in the vehicle 10. The seat device 21 includes a seat body 21A, a seat operation mechanism 21B that operates the seat body 21A, a seat actuator 21C that operates the seat operation mechanism 21B, and a control unit 21D that controls the seat actuator 21C.

The seat body 21A includes a seat cushion and a seatback. The seat cushion is connected in a slidable manner in a front-rear direction of the vehicle 10 via a slide mechanism of the seat operation mechanism 21B provided on a floor of the vehicle 10. The slide mechanism includes a lower rail fixed to the floor of the vehicle 10 and an upper rail attached to the lower rail in a slidable manner in the front-rear direction. The upper rail slides with the drive of a motor for slide of the seat actuator 21C with respect to the lower rail. In this way, the seat device 21 has a slide function of the seat body 21A.

The seatback is connected to a rear end portion of the seat cushion of the seat body 21A in a rotatable manner while being inclined with respect to the seat cushion via a reclining mechanism of the seat operation mechanism 21B. By driving a motor for reclining of the seat actuator 21C, the seatback rotates with an axis extending in a width direction of the vehicle 10 as a rotation axis while being inclined with respect to the seat cushion. In this way, the seat device 21 has a reclining function of the seat body 21A.

By operating a switch for seat operation (not shown), the control unit 21D drives the motor for reclining of the seat actuator 21C. As a result, the control unit 21D controls a slide position that is a position of the seat body 21A in the front-rear direction of the vehicle. Further, by operating the switch for seat operation (not shown), the control unit 21D drives the motor for reclining of the seat actuator 21C. As a result, the control unit 21D controls a reclining position that is an angle of the seatback with respect to the seat cushion. The shade device 22 changes a range of window glass in the vehicle 10 to affect the brightness of the vehicle cabin environment of the vehicle 10, the sense of openness of the occupant in the vehicle 10, and the like. The shade device 22 is provided for each window glass. In the present embodiment, the shade device 22 is provided on each of roof glass provided on a roof of the vehicle 10 and rear glass provided on a rear portion of the vehicle 10. In FIG. 1, solely one shade device 22 is shown.

The shade device 22 includes a shade body 22A, a shade operation mechanism 22B that operates the shade body 22A, a shade actuator 22C that operates the shade operation mechanism 22B, and a control unit 22D that controls the shade actuator 22C.

The shade body 22A is a curtain body that covers the glass of the vehicle 10 from the vehicle cabin side of the vehicle 10. The shade body 22A is connected to be operable between a closed state in which the glass is covered and an open state in which the glass is not covered, via the shade operation mechanism 22B. By driving a motor of the shade actuator 22C, the shade body 22A is wound up, and the shade body 22A is in the open state. In addition, by driving the shade actuator 22C, the shade body 22A is rewound, and the shade body 22A is in the closed state. In this way, the shade device 22 has a shade function of the shade body 22A.

By operating a switch for roof shade operation (not shown), the control unit 22D drives the shade actuator 22C of the shade device 22 provided on the roof glass. As a result, the control unit 22D controls the open/closed state of the shade device 22 provided on the roof glass. Further, by operating a switch for rear shade operation (not shown), the control unit 22D drives the shade actuator 22C of the shade device 22 provided on the rear glass. As a result, the control unit 22D controls the open/closed state of the shade device 22 provided on the rear glass.

The dimming device 23 changes the light transmittance of the window glass in the vehicle 10 to affect an amount of light coming in a vehicle cabin of the vehicle 10 from the outside of the vehicle 10. The dimming device 23 includes dimming glass 23A, a dimming mechanism 23B that changes the light transmittance of the dimming glass 23A, a dimming actuator 23C that operates the dimming mechanism 23B, and a control unit 23D that controls the dimming actuator 23C.

The dimming device 23 is provided on the roof glass of the vehicle 10. The dimming glass 23A is the roof glass of the vehicle 10. The dimming glass 23A has two glass layers and two dimming film layers interposed between the two glass layers. The dimming film layer changes operations of dispersion and orientation of a minute material included in the dimming film layer by using a voltage applied by the dimming mechanism 23B. By driving the switch that is the dimming actuator 23C, the voltage is applied to the dimming film layer. As a result, the operations of the dispersion and orientation of the minute material included in the dimming film layer is changed. As a result, depending on the applied voltage, the dimming glass 23A is in a dimming mode in which the dimming glass 23A is not transparent and the light transmittance of the light from the outside of the vehicle 10 is low or a light transmission mode in which the dimming glass 23A is transparent and the light transmittance of the light from the outside of the vehicle 10 is high. In this way, the dimming device 23 has a dimming function of the dimming glass 23A.

The control unit 23D drives the dimming actuator 23C by operating a switch for dimming operation (not shown). As a result, the control unit 23D controls a state of the dimming glass 23A.

The vehicle cabin illumination device 24 changes a mode of an illumination that illuminates the vehicle cabin of the vehicle 10 to affect the brightness of the vehicle cabin of the vehicle 10. The vehicle cabin illumination device 24 includes a lamp 24A including a light emitting mechanism 24B, an illumination actuator 24C that operates the light emitting mechanism 24B, and a control unit 24D that controls the illumination actuator 24C.

The vehicle cabin illumination device 24 is provided in the vehicle cabin of the vehicle 10. The lamp 24A is, for example, an LED. By driving a switch that is the illumination actuator 24C, the light emitting mechanism 24B operates, and the lamp 24A is in a lighting state or a non-lighting state. The lamp 24A can achieve fade-in lighting and fade-out lighting by driving the illumination actuator 24C. In this way, the vehicle cabin illumination device 24 has an illumination function.

The control unit 24D controls the drive of the illumination actuator 24C by operating a switch for illumination (not shown). As a result, the control unit 24D controls a state of the lamp 24A. In the present embodiment, the vehicle 10 includes a plurality of vehicle cabin illumination devices 24.

The air conditioning device 25 adjusts a temperature in the vehicle 10 to affect a temperature environment, such as a temperature in the vehicle cabin of the vehicle 10. The air conditioning device 25 includes an air conditioning device body 25A including an air conditioning mechanism 25B, an air conditioning actuator 25C that operates the air conditioning mechanism 25B, and a control unit 25D that controls the air conditioning actuator 25C.

An air outlet of the air conditioning device body 25A is provided to blow air toward a vehicle cabin space of the vehicle 10. The air conditioning device body 25A blows the air with the adjusted temperature from the air outlet by operating the air conditioning mechanism 25B by driving an air compressor and a heat exchanger that are the air conditioning actuator 25C. In this way, the air conditioning device 25 has an air conditioning function.

The control unit 25D controls the drive of the air conditioning actuator 25C by operating a switch for air conditioning (not shown). As a result, the control unit 25D controls an air blowing state from the air outlet of the air conditioning device body 25A.

The audio device 26 changes audio output in the vehicle 10 to affect a sound environment in the vehicle cabin of the vehicle 10. The audio device 26 includes a speaker 26A including an audio mechanism 26B, an audio actuator 26C that operates the audio mechanism 26B, and a control unit 26D that controls the audio actuator 26C.

The speaker 26A outputs audio by operating the audio mechanism 26B to the inside of the vehicle 10. The speaker 26A outputs the audio by a vibration of a coil that is the audio actuator 26C. In this way, the audio device 26 has an audio function.

The control unit 26D drives the audio actuator 26C by operating a switch for audio (not shown). As a result, the control unit 26D controls the audio output from the speaker 26A.

The steering position adjustment device 27 affects a space of a driver's seat in the vehicle 10 by adjusting a position of a steering wheel 27A in the vehicle 10. The steering position adjustment device 27 includes the steering wheel 27A and a position adjustment mechanism 27B that can adjust the position of the steering wheel 27A. The steering position adjustment device 27 includes a position adjustment actuator 27C that operates the position adjustment mechanism 27B and a control unit 27D that controls the position adjustment actuator 27C.

The steering wheel 27A is provided on the driver's seat of the vehicle 10. The steering wheel 27A is adjustable in position in the front-rear direction and an up-down direction of the vehicle 10 via the position adjustment mechanism 27B. The position adjustment mechanism 27B achieves a so-called tilt and telescopic function. By driving a motor that is the position adjustment actuator 27C, the position of the steering wheel 27A in the vehicle 10 is changed. In this way, the steering position adjustment device 27 has a position adjustment function.

By operating a switch for steering position adjustment (not shown), the control unit 27D drives the position adjustment actuator 27C. As a result, the control unit 27D controls the position of the steering wheel 27A.

As described above, the operation devices 20 are individually operable by operating the switch provided for each operation device 20.

The vehicle 10 includes a mode switch 30 and a control device 40. The mode switch 30 is operated by a user to output a signal indicating that mode control for collectively controlling the operation devices 20 is executed, to the control device 40. The mode switch 30 outputs a signal indicating a mode in which the mode control is executed, to the control device 40 in response to the operation of the user.

The control device 40 collectively controls the operation devices 20 in a plurality of modes. The control device 40 acquires the signal indicating that the mode control is executed, from the mode switch 30. The control device 40 acquires the signal indicating the mode in which the mode control is executed, from the mode switch 30. Each mode is a mode for achieving the vehicle cabin environment of the vehicle 10. In the present embodiment, the modes include a first mode and a second mode.

The control device 40 includes a CPU that is an execution device 41, a peripheral circuit 42, a RAM 43, a storage device 44, and a bus 45. In the present embodiment, the execution device 41 is an execution unit, and the storage device 44 is a storage unit (memory). The bus 45 connects the execution device 41, the peripheral circuit 42, the RAM 43, and the storage device 44 to each other in a communicable manner. The execution device 41 executes various programs stored in the storage device 44 to execute information processing. The peripheral circuit 42 includes a circuit that generates a clock signal defining an internal operation, a power supply circuit, a reset circuit, and the like. The RAM 43 stores data generated in conjunction with the execution of the execution device 41. The storage device 44 stores a mode control program MP executed by the execution device 41 and a mode setting value set MS used in conjunction with the execution of the mode control program MP.

Mode Setting Value Set

As shown in FIG. 2, the mode setting value set MS is a data set in which setting values of information corresponding to each of the modes for achieving the vehicle cabin environment of the vehicle 10 are determined. In the mode setting value set MS, information indicating a length of a first period, information indicating operation devices 20 that are the targets to be operated during the first period, and information indicating operation contents of the operation devices 20 that are the targets to be operated during the first period are determined corresponding to each mode. In the mode setting value set MS, information indicating a length of a second period following the first period, information indicating operation devices 20 that are the targets to be operated during the second period, and information indicating operation contents of the operation devices 20 that are the targets to be operated during the second period are determined corresponding to each mode. In the mode setting value set MS, information indicating a length of a third period following the second period, information indicating operation devices 20 that are the targets to be operated during the third period, and information indicating operation contents of the operation devices 20 that are the targets to be operated during the third period are determined corresponding to each mode. In the mode setting value set MS, information indicating a length of a fourth period following the third period, information indicating operation devices 20 that are the targets to be operated during the fourth period, and information indicating operation contents of the operation devices 20 that are the targets to be operated during the fourth period are determined corresponding to each mode.

Each information in the mode setting value set MS in the present embodiment is shown in the example shown in FIG. 2 as follows. The length of the first period in the first mode is a period length a. That is, a value of the period length a is information indicating the length of the first period in the first mode. The operation devices 20 that are the targets to be operated during the first period in the first mode is a first operation device to a fourth operation device. That is, IDs indicating the first operation device to the fourth operation device are information indicating the operation devices 20 that are the targets to be operated during the first period in the first mode. In FIGS. 2 and 3, in a case where the operation devices 20 are distinguished from each other, the operation devices are indicated as the first operation device to the fourth operation device. The operation content of the first operation device that is the target to be operated during the first period in the first mode is an operation outline AA. The operation content of the second operation device that is the target to be operated during the first period in the first mode is an operation outline BA. The operation content of the third operation device that is the target to be operated during the first period in the first mode is an operation outline CA. The operation content of the fourth operation device that is the target to be operated during the first period in the first mode is an operation outline DA. That is, the information indicating the operation outline AA to the operation outline DA is the information indicating the operation content of each operation device 20 that is the target to be operated during the first mode in the first period.

The length of the second period in the first mode is a period length b. The operation devices 20 that are the targets to be operated during the second period in the first mode are the first operation device to the fourth operation device. The operation content of the first operation device that is the target to be operated during the second period in the first mode is an operation outline AB. The operation content of the second operation device that is the target to be operated during the second period in the first mode is an operation outline BB. The operation content of the third operation device that is the target to be operated during the second period in the first mode is an operation outline CB. The operation content of the fourth operation device that is the target to be operated during the second period in the first mode is an operation outline DB.

The length of the third period in the first mode is a period length c. The operation devices 20 that are the targets to be operated during the third period in the first mode are the first operation device to the fourth operation device. The operation content of the first operation device that is the target to be operated during the third period in the first mode is an operation outline AC. The operation content of the second operation device that is the target to be operated during the third period in the first mode is the operation outline BC. The operation content of the third operation device that is the target to be operated during the third period in the first mode is an operation outline CC. The operation content of the fourth operation device that is the target to be operated during the third period in the first mode is an operation outline DC.

The length of the fourth period in the first mode is a period length d. The operation devices 20 that are the targets to be operated during the fourth period in the first mode are the first operation device to the fourth operation device. The operation content of the first operation device that is the target to be operated during the fourth period in the first mode is an operation outline AD. The operation content of the second operation device that is the target to be operated during the fourth period in the first mode is an operation outline BD. The operation content of the third operation device that is the target to be operated during the fourth period in the first mode is an operation outline CD. The operation content of the fourth operation device that is the target to be operated during the fourth period in the first mode is an operation outline DD. In the present embodiment, the operation devices 20 that are the targets to be operated are the same in all the periods in the first mode.

In addition, the length of the first period in the second mode is a period length f. The operation devices 20 that are the targets to be operated during the first period in the second mode are the first operation device to the fourth operation device. The operation content of the first operation device that is the target to be operated during the first period in the second mode is an operation outline AF. The operation content of the second operation device that is the target to be operated during the first period in the second mode is an operation outline BF. The operation content of the third operation device that is the target to be operated during the first period in the second mode is an operation outline CF. The operation content of the fourth operation device that is the target to be operated during the first period in the second mode is an operation outline DF.

The length of the second period in the second mode is a period length g. The operation devices 20 that are the targets to be operated during the second period in the second mode are the first operation device to the fourth operation device. The operation content of the first operation device that is the target to be operated during the second period in the second mode is an operation outline AG. The operation content of the second operation device that is the target to be operated during the second period in the second mode is an operation outline BG. The operation content of the third operation device that is the target to be operated during the second period in the second mode is an operation outline CG. The operation content of the fourth operation device that is the target to be operated during the second period in the second mode is an operation outline DG.

The length of the third period in the second mode is a period length h. The operation devices 20 that are the targets to be operated during the third period in the second mode are the first operation device to the fourth operation device. The operation content of the first operation device that is the target to be operated during the third period in the second mode is an operation outline AH. The operation content of the second operation device that is the target to be operated during the third period in the second mode is an operation outline BH. The operation content of the third operation device that is the target to be operated during the third period in the second mode is an operation outline CH. The operation content of the fourth operation device that is the target to be operated during the third period in the second mode is an operation outline DH.

The length of the fourth period in the second mode is a period length i. The operation devices 20 that are the targets to be operated during the fourth period in the second mode are the first operation device to the fourth operation device. The operation content of the first operation device that is the target to be operated during the fourth period in the second mode is an operation outline AI. The operation content of the second operation device that is the target to be operated during the fourth period in the second mode is an operation outline BI. The operation content of the third operation device that is the target to be operated during the fourth period in the second mode is the operation outline CI. The operation content of the fourth operation device that is the target to be operated during the fourth period in the second mode is an operation outline DI. In the present embodiment, the operation devices 20 that are the targets to be operated are the same in all the periods in the second mode.

The information corresponding to the first mode in the mode setting value set MS is at least partially different from the information corresponding to the second mode in the mode setting value set MS. In the present embodiment, the period length a, which is the length of the first period corresponding to the first mode in the mode setting value set MS, is the same as the period length f, which is the length of the first period corresponding to the second mode. On the other hand, the operation outlines AA to AD of each period of the first operation device corresponding to the first mode in the mode setting value set MS are different from the operation outlines AF to AI of each period of the first operation device corresponding to the second mode.

As shown in FIG. 3, the mode setting value set MS includes information indicating details of the operation in each period. FIG. 3 shows information indicating details of the operation content of the first operation device in the first period in the first mode in FIG. 2. In the information indicating the details of the operation in each period, four timings are determined in one period. Further, in the information indicating the details of the operation in each period, the four timings and an operation that is started at each timing are determined.

The information indicating the details of the operation in the first period in the first mode in the mode setting value set MS in the present embodiment is shown in the example shown in FIG. 3 as follows. A length of a period from the start of the control of the first period to the first timing in the first mode is a period length aa. The details of the operation of the first operation device that is started at the first timing after the control of the first period is started in the first mode are operation details AAa. The details of the operation of the second operation device that is started at the first timing are operation details BAa. The details of the operation of the third operation device that is started at the first timing are operation details CAa. The details of the operation of the fourth operation device that is started at the first timing are operation details DAa.

A length of a period from the first timing to the second timing in the first mode is a period length ab. The details of the operation of the first operation device that is started at the second timing after the first timing in the first mode are operation details AAb. In addition, the details of the operation of the second operation device that is started at the second timing are operation details BAb. The details of the operation of the third operation device that is started at the second timing are operation details CAb. The details of the operation of the fourth operation device that is started at the second timing are operation details DAb.

A length of a period from the second timing in the first mode to the third timing is a period length ac. In addition, the details of the operation of the first operation device that is started at the third timing are operation details AAc. In addition, the details of the operation of the second operation device that is started at the third timing are operation details BAc. The details of the operation of the third operation device that is started at the third timing are operation details CAc. The details of the operation of the fourth operation device that is started at the third timing are operation details DAc.

A length of a period from the third timing to the fourth timing in the first mode is a period length ad. The details of the operation of the first operation device that is started at the fourth timing after the third timing in the first mode are operation details AAd. In addition, the details of the operation of the second operation device that is started at the fourth timing are operation details BAd. The details of the operation of the third operation device that is started at the fourth timing are operation details CAd. The details of the operation of the fourth operation device that is started at the fourth timing are operation details DAd.

The operation outline AA, which is the operation content of the first operation device in the first mode, is the content composed of the operation details AAa to the operation details AAd. The operation outline BA, which is the operation content of the second operation device in the first mode, is the content composed of the operation details BAa to the operation details BAd. The operation outline CA, which is the operation content of the third operation device in the first mode, is the content composed of the operation details CAa to the operation details CAd. The operation outline DA, which is the operation content of the fourth operation device in the first mode, is the content composed of the operation details DAa to the operation details DAd. The period length a that is the length of the first period is a period equal to or longer than a length obtained by adding the period length aa to the period length ad.

Control Using Mode Setting Value Set

Next, a flow of control executed by the control device 40 in the modes using the mode setting value set MS will be described. The execution device 41 starts the execution of the mode control program MP when the signal indicating that the mode control is executed is acquired from the mode switch 30.

Figure 4:
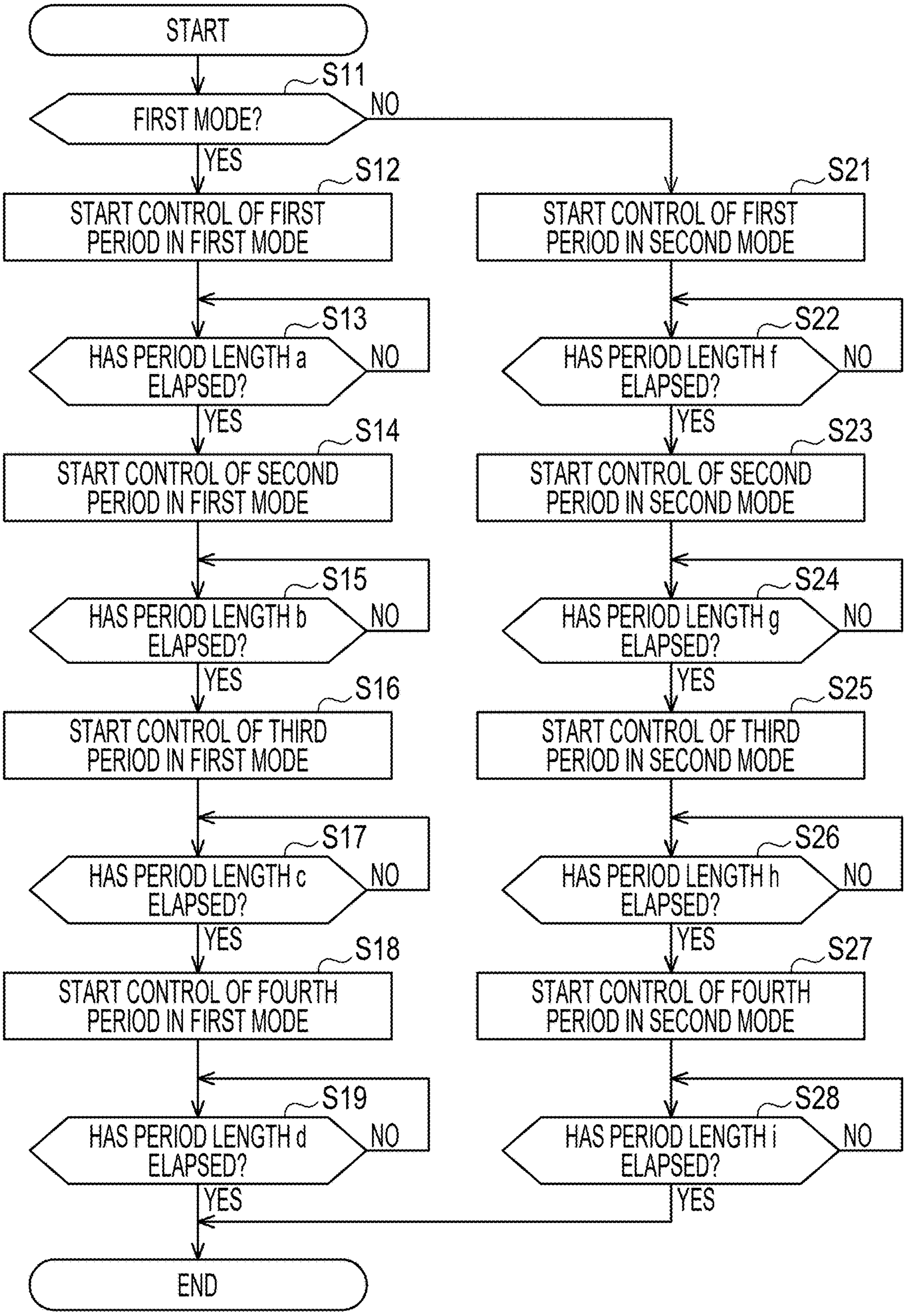
FIG. 4 is a flowchart showing control in each mode.

As shown in FIG. 4, when the execution of the mode control program MP is started, the execution device 41 first executes the processing of step S11. In step S11, the execution device 41 determines the mode to be executed among the modes based on the signal indicating the mode acquired from the mode switch 30. In step S11, the execution device 41 determines whether or not the mode to be executed is the first mode based on the signal acquired from the mode switch 30. When a determination is made that the mode to be executed is the first mode (S11: YES), the execution device 41 advances the processing to step S12.

In step S12, the execution device 41 starts the control of the first period in the first mode. The execution device 41 starts the control of the operation outline AA for the first operation device by referring to the mode setting value set MS. The execution device 41 starts the control of the operation outline BA for the second operation device by referring to the mode setting value set MS. The execution device 41 starts the control of the operation outline CA for the third operation device by referring to the mode setting value set MS. The execution device 41 starts the control of the operation outline DA for the fourth operation device by referring to the mode setting value set MS. Thereafter, the execution device 41 advances the processing to step S13.

In step S13, the execution device 41 determines whether or not the period length a has elapsed from the start of the processing of step S12. Specifically, the execution device 41 compares the length of the period that has elapsed from the start of the control of the first period in the first mode via the processing of step S12 with the period length a. When the period length a has not elapsed from the start of the processing of step S12 (S13: NO), the execution device 41 repeats the processing of step S13. When the period length a has elapsed from the start of the processing of step S12 (S13: YES), the execution device 41 advances the processing to step S14.

In step S14, the execution device 41 starts the control of the second period in the first mode. The execution device 41 starts the control of the operation outline AB for the first operation device by referring to the mode setting value set MS. The execution device 41 starts the control of the operation outline BB for the second operation device by referring to the mode setting value set MS. The execution device 41 starts the control of the operation outline CB for the third operation device by referring to the mode setting value set MS. The execution device 41 starts the control of the operation outline DB for the fourth operation device by referring to the mode setting value set MS. Thereafter, the execution device 41 advances the processing to step S15.

In step S15, the execution device 41 determines whether or not the period length b has elapsed from the start of the processing of step S14. Specifically, the execution device 41 compares the length of the period that has elapsed from the start of the control of the second period in the first mode via the processing of step S14 with the period length b. When the period length b has not elapsed from the start of the processing of step S14 by the execution device 41 (S15: NO), the execution device 41 repeats the processing of step S15. When the period length b has elapsed from the start of the processing of step S14 (S15: YES), the execution device 41 advances the processing to step S16.

In step S16, the execution device 41 starts the control of the third period in the first mode. The execution device 41 starts the control of the operation outline AC for the first operation device by referring to the mode setting value set MS. The execution device 41 starts the control of the operation outline BC for the second operation device by referring to the mode setting value set MS. The execution device 41 starts the control of the operation outline CC for the third operation device by referring to the mode setting value set MS. The execution device 41 starts the control of the operation outline DC for the fourth operation device by referring to the mode setting value set MS. Thereafter, the execution device 41 advances the processing to step S17.

In step S17, the execution device 41 determines whether or not the period length c has elapsed from the start of the processing of step S16. Specifically, the execution device 41 compares the length of the period that has elapsed from the start of the control of the third period in the first mode via the processing of step S16 with the period length c. When the period length c has not elapsed from the start of the processing of step S16 (S16: NO), the execution device 41 repeats the processing of step S17. When the period length c has elapsed from the start of the processing of step S16 (S17: YES), the execution device 41 advances the processing to step S18.

In step S18, the execution device 41 starts the control of the fourth period in the first mode. The execution device 41 starts the control of the operation outline AD for the first operation device by referring to the mode setting value set MS. The execution device 41 starts the control of the operation outline BD for the second operation device by referring to the mode setting value set MS. The execution device 41 starts the control of the operation outline CD for the third operation device by referring to the mode setting value set MS. The execution device 41 starts the control of the operation outline DD for the fourth operation device by referring to the mode setting value set MS. Thereafter, the execution device 41 advances the processing to step S19.

In step S19, the execution device 41 determines whether or not a period length d has elapsed from the start of the processing of step S18. Specifically, the execution device 41 compares the length of the period that has elapsed from the start of the control of the fourth period in the first mode via the processing of step S16 with the period length d. When the period length d has not elapsed from the start of the processing of step S18 (S19: NO), the execution device 41 repeats the processing of step S19. When the period length d has elapsed from the start of the processing of step S18 (S19: YES), the execution device 41 ends the present series of processing.

When a determination is made that the mode to be executed is the second mode, not the first mode (S11: NO), the execution device 41 advances the processing to step S21. In step S21, the execution device 41 starts the control of the first period in the second mode. The execution device 41 starts the control of the operation outline AF for the first operation device by referring to the mode setting value set MS. The execution device 41 starts the control of the operation outline BF for the second operation device by referring to the mode setting value set MS. The execution device 41 starts the control of the operation outline CF for the third operation device by referring to the mode setting value set MS. The execution device 41 starts the control of the operation outline DF for the fourth operation device by referring to the mode setting value set MS. Thereafter, the execution device 41 advances the processing to step S22.

In step S22, the execution device 41 determines whether or not the period length f has elapsed from the start of the processing of step S21. Specifically, the execution device 41 compares the length of the period that has elapsed from the start of the control of the first period in the second mode via the processing of step S21 with the period length f. When the period length f has not elapsed from the start of the processing of step S21 (S22: NO), the execution device 41 repeats the processing of step S22. When the period length f has elapsed from the start of the processing of step S22 (S22: YES), the execution device 41 advances the processing to step S23.

In step S23, the execution device 41 starts the control of the second period in the second mode. The execution device 41 starts the control of the operation outline AG for the first operation device by referring to the mode setting value set MS. The execution device 41 starts the control of the operation outline BG for the second operation device by referring to the mode setting value set MS. The execution device 41 starts the control of the operation outline CG for the third operation device by referring to the mode setting value set MS. The execution device 41 starts the control of the operation outline DG for the fourth operation device by referring to the mode setting value set MS. Thereafter, the execution device 41 advances the processing to step S24.

In step S24, the execution device 41 determines whether or not the period length g has elapsed from the start of the processing of step S23. Specifically, the execution device 41 compares the length of the period that has elapsed from the start of the control of the second period in the second mode via the processing of step S23 with the period length g. When the period length g has not elapsed from the start of the processing of step S23 (S24: NO), the execution device 41 repeats the processing of step S24. When the period length g has elapsed from the start of the processing of step S23 (S24: YES), the execution device 41 advances the processing to step S25.

In step S25, the execution device 41 starts the control of the third period in the second mode. The execution device 41 starts the control of the operation outline AH for the first operation device by referring to the mode setting value set MS. The execution device 41 starts the control of the operation outline BH for the second operation device by referring to the mode setting value set MS. The execution device 41 starts the control of the operation outline CH for the third operation device by referring to the mode setting value set MS. The execution device 41 starts the control of the operation outline DH for the fourth operation device by referring to the mode setting value set MS. Thereafter, the execution device 41 advances the processing to step S26.

In step S26, the execution device 41 determines whether or not the period length h has elapsed from the start of the processing of step S25. Specifically, the execution device 41 compares the length of the period that has elapsed from the start of the control of the third period in the second mode via the processing of step S25 with the period length h. When the period length h has not elapsed from the start of the processing of step S25 (S26: NO), the execution device 41 repeats the processing of step S26. When the period length h has elapsed from the start of the processing of step S25 (S26: YES), the execution device 41 advances the processing to step S27.

In step S27, the execution device 41 starts the control of the fourth period in the second mode. The execution device 41 starts the control of the operation outline AI for the first operation device by referring to the mode setting value set MS. The execution device 41 starts the control of the operation outline BI for the second operation device by referring to the mode setting value set MS. The execution device 41 starts the control of the operation outline CI for the third operation device by referring to the mode setting value set MS. The execution device 41 starts the control of the operation outline DI for the fourth operation device by referring to the mode setting value set MS. Thereafter, the execution device 41 advances the processing to step S28.

In step S28, the execution device 41 determines whether or not the period length i has elapsed from the start of the processing of step S27. Specifically, the execution device 41 compares the length of the period that has elapsed from the start of the control of the fourth period in the second mode via the processing of step S27 with the period length i. When the period length i has not elapsed from the start of the processing of step S28 (S28: NO), the execution device 41 repeats the processing of step S28. When the period length i has elapsed from the start of the processing of step S28 (S28: YES), the execution device 41 ends the present series of processing. As described above, the execution device 41 advances the processing in the same flow with reference to the mode setting value set MS for the control in the first mode and the control in the second mode.

Details of Operation in Each Period

Next, a detailed operation flow of the execution device 41 in each period will be described. When the execution device 41 starts the control of one period in each mode, the execution device 41 executes the control of the period with reference to the information indicating the details of the operation in the period included in the mode setting value set MS. Hereinafter, the detailed operation flow in the first period in the first mode will be described, and the detailed operation flows in the other periods in the first mode and each period in the second mode will be omitted.

Figure 5:
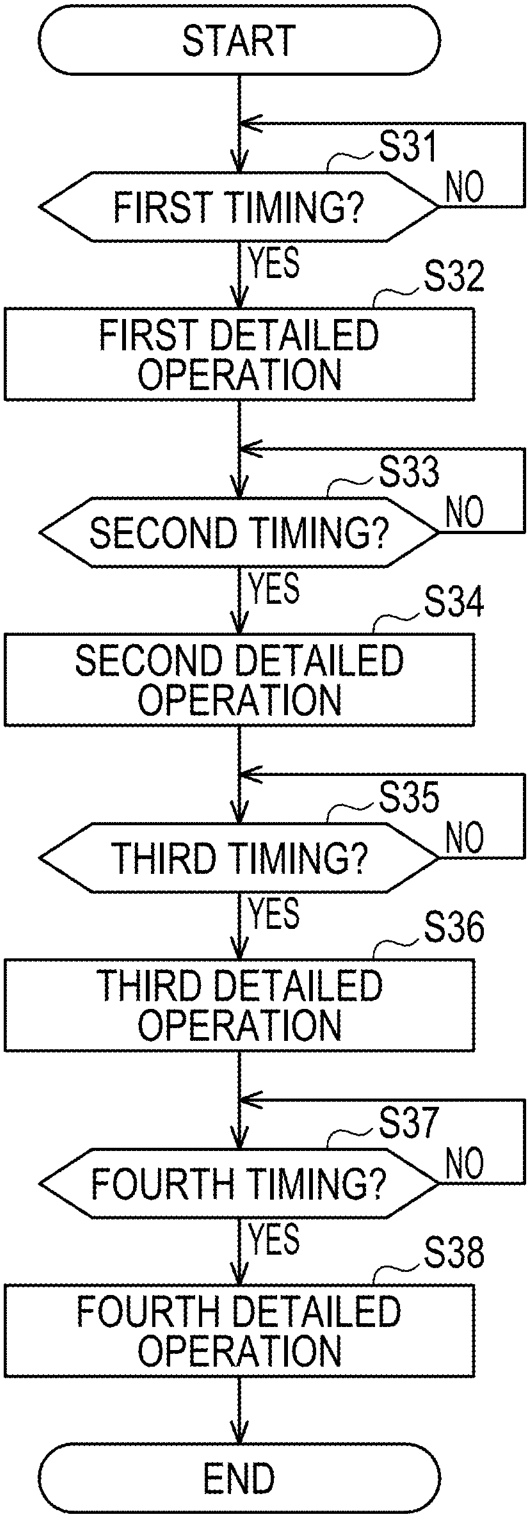
FIG. 5 is a flowchart showing details of the control of one period in each mode.

As shown in FIG. 5, when the execution device 41 starts the processing of step S12 in FIG. 4, that is, the control of the first period in the first mode, the execution device 41 first starts the processing of step S31. In step S31, the execution device 41 determines whether or not the first timing has arrived. Specifically, the execution device 41 refers to the information indicating the details of the operation in the first period in the first mode in the mode setting value set MS shown in FIG. 3. As shown in FIG. 5, the execution device 41 determines whether or not the period length aa has elapsed from the start of the control of the first period in the first mode, with reference to the information. When the first timing has not arrived because the period length aa has not elapsed (S31: NO), the execution device 41 repeats the processing of step S31. On the other hand, when the first timing has arrived because the period length aa has elapsed (S31: YES), the execution device 41 advances the processing to the processing of step S32.

In step S32, the execution device 41 starts, at the first timing, the control of the first detailed operation for the operation device 20 that is the target. Specifically, the execution device 41 starts the control of the operation details AAa for the first operation device. The execution device 41 starts the control of the operation details BAa for the second operation device. The execution device 41 starts the control of the operation details CAa for the third operation device. The execution device 41 starts the control of the operation details DAa for the fourth operation device. Thereafter, the execution device 41 advances the processing to step S33.

In step S33, the execution device 41 determines whether or not the second timing has arrived. Specifically, the execution device 41 refers to the information indicating the details of the operation in the first period in the first mode in the mode setting value set MS. The execution device 41 determines whether or not the period length ab has elapsed from the first timing in the first mode, with reference to the information. When the second timing has not arrived because the period length ab has not elapsed (S33: NO), the execution device 41 repeats the processing of step S33. On the other hand, when the second timing has arrived because the period length ab has elapsed (S33: YES), the execution device 41 advances the processing to step S34.

In step S34, the execution device 41 starts, at the second timing, the control of the second detailed operation on the operation device 20 that is the target. Specifically, the execution device 41 starts the control of the operation details AAb for the first operation device. The execution device 41 starts the control of the operation details BAb for the second operation device. The execution device 41 starts the control of the operation details CAb for the third operation device. The execution device 41 starts the control of the operation details DAb for the fourth operation device. Thereafter, the execution device 41 advances the processing to step S35.

In step S35, the execution device 41 determines whether or not the third timing has arrived. Specifically, the execution device 41 refers to the information indicating the details of the operation in the first period in the first mode in the mode setting value set MS. The execution device 41 determines whether or not the period length ac has elapsed after the second timing in the first mode, with reference to the information. When the third timing has not arrived because the period length ac has not elapsed (S35: NO), the execution device 41 repeats the processing of step S35. On the other hand, when the third timing has arrived because the period length ac has elapsed (S35: YES), the execution device 41 advances the processing to step S36.

In step S36, the execution device 41 starts, at the third timing, the control of the third detailed operation on the operation device 20 that is the target. Specifically, the execution device 41 starts the control of the operation details AAc for the first operation device. The execution device 41 starts the control of the operation details BAc for the second operation device. The execution device 41 starts the control of the operation details CAc for the third operation device. The execution device 41 starts the control of the operation details DAc for the fourth operation device. Thereafter, the execution device 41 advances the processing to step S37.

In step S37, the execution device 41 determines whether or not the fourth timing has arrived. Specifically, the execution device 41 refers to the information indicating the details of the operation in the first period in the first mode in the mode setting value set MS. The execution device 41 determines whether or not the period length ad has elapsed after the third timing in the first mode, with reference to the information. When the fourth timing has not arrived because the period length ad has not elapsed (S37: NO), the execution device 41 repeats the processing of step S37. On the other hand, when the fourth timing has arrived because the period length ad has elapsed (S37: YES), the execution device 41 advances the processing to step S38.

In step S38, the execution device 41 starts, at the fourth timing, the control of the fourth detailed operation on the operation device 20 that is the target. Specifically, the execution device 41 starts the control of the operation details AAd for the first operation device. The execution device 41 starts the control of the operation details BAd for the second operation device. The execution device 41 starts the control of the operation details CAd for the third operation device. The execution device 41 starts the control of the operation details DAd for the fourth operation device. Thereafter, the execution device 41 ends the present series of processing. When the details of the operation at a predetermined timing are not determined in the mode setting value set MS, the previous operation is continued even though the predetermined timing has arrived.

Example of Mode Setting Value Set

Next, an example of the setting value in the predetermined mode in the mode setting value set MS will be described. As shown in FIG. 6, in the predetermined mode, each period is determined as follows. The first period is an opening period. The second period is a main period. The third period is a pre-end period. The fourth period is a mode end period.

In the predetermined mode, functions to be used are determined as a BGM function, the shade function in the rear glass, the shade function in the roof glass, the dimming function, the air conditioning function, the reclining function, and an illumination function. In the predetermined mode, the operation devices 20 that are the targets to be controlled is associated with each function to be used, as follows. The operation device 20 for achieving the BGM function is the audio device 26. The operation device 20 for achieving the shade function in the rear glass and the shade function in the roof glass is the shade device 22. The operation device 20 for achieving the dimming function is the dimming device 23. The operation device 20 for achieving the air conditioning function is the air conditioning device 25. The operation device 20 for achieving the reclining function is the seat device 21. The operation device 20 for achieving the illumination function is the vehicle cabin illumination device 24.

Further, the details of the operation of each operation device 20 are as follows. The operation of the audio device 26 at the first timing in the opening period is audio output in a start mode. The operation of the audio device 26 at the second timing to the fourth timing in the opening period is not determined. Therefore, the operation content of the audio device 26 in the opening period is solely the audio output in the start mode. The audio in the start mode is predetermined music. The operation of the audio device 26 at the first timing in the main period is audio output in a main mode. The audio in the main mode is predetermined music. In the audio output in the main mode, for example, the audio device 26 repeatedly outputs the predetermined music. The operation of the audio device 26 at the first timing in the pre-end period is audio output in a pre-end mode. The audio of the pre-end mode is predetermined music. The operation at the first timing in the mode end period is audio output in an end mode. The audio of the end mode is predetermined music. In FIG. 6, the fact that the details of the content are standby is indicated by "-". In the present embodiment, the standby means an operation of maintaining a state after the completion of the previous detailed operation.

The operation of the shade device 22 at the first timing in the opening period is storage of a state. That is, whether the state of the shade device 22 is the open state or the closed state is stored. The operation of the shade device 22 at the second timing in the opening period is transition to the open state. The operations of the shade device 22 in the main period and the pre-end period are not determined. That is, the operation of the shade device 22 in the period is maintaining of the open state. The operation of the shade device 22 at the first timing in the mode end period is return. That is, the shade device 22 returns the state to the state stored at the first timing in the opening period.

The operation of the dimming device 23 at the first timing in the opening period is storage of a state. That is, whether the state of the dimming device 23 is the dimming mode or the light transmission mode is stored. The operation of the dimming device 23 at the second timing in the opening period is transition to the dimming mode. The operations of the dimming device 23 in the main period and the pre-end period are not determined. That is, the operation of the dimming device 23 in the period is maintaining of the dimming mode. The operation of the dimming device 23 at the first timing in the mode end period is return. That is, the dimming device 23 returns the state to the state stored at the first timing in the opening period.

The operation of the air conditioning device 25 at the first timing in the opening period is storage of a state. That is, the air conditioning device 25 stores a temperature setting and an air volume setting of the air conditioning device 25. The operation of the air conditioning device 25 at the second timing in the opening period is transition to an auto mode. As a result, the air conditioning device 25 starts the driving in the auto mode with the temperature setting and the air volume setting stored at the first timing in the opening period. The operation of the air conditioning device 25 at the first timing in the main period is adjustment. Specifically, the air conditioning device 25 adjusts the set temperature setting and air volume setting in accordance with the predetermined mode to execute the driving in the auto mode. The operation of the air conditioning device 25 at the first timing in the mode end period is return. That is, the air conditioning device 25 returns the settings to the temperature setting and the air volume setting stored at the first timing in the mode end period.

The operation of the seat device 21 at the first timing in the opening period is storage of a state. That is, the seat device 21 stores the slide position and the reclining position of the seat device 21. The operation of the seat device 21 at the second timing in the opening period is transition to a start position. The start position is an initial set position of the slide position and the reclining position of the seat device 21 in the predetermined main period. The operation of the seat device 21 at the first timing in the main period is transition to a specified position. The specified position is a predetermined position of the reclining position separately from the start position. For example, the specified position is determined as a position at which the seatback is tilted more than the start position. The operation of the seat device 21 in the pre-end period is not determined. That is, the operation of the seat device 21 in the period is maintaining of the specified position. The operation of the seat device 21 at the first timing in the mode end period is return. That is, the seat device 21 returns the position of the seat body 21A to the position stored at the first timing in the opening period.

The operation of the vehicle cabin illumination device 24 at the first timing in the opening period is storage of a state. That is, the vehicle cabin illumination device 24 stores a lighting state of the lamp 24A that is lighted among a plurality of lamps 24A. The operation at the second timing in the opening period is the fade-in lighting. The operation of the vehicle cabin illumination device 24 at the first timing in the main period is lighting of a main illumination. A lighting content of the main illumination is an illumination content in which a type of the lamp 24A to be lighted, the brightness of the lighting, a fade pattern, a fade time, and a color are determined in advance. The operation of the vehicle cabin illumination device 24 at the first timing in the mode end period is lighting in the end mode. The lighting in the end mode is a predetermined lighting content. The operation of the vehicle cabin illumination device 24 at the second timing in the mode end period is lighting indicating notification of the end. The lighting indicating the notification of the end is a predetermined lighting content. The operation of the vehicle cabin illumination device 24 at the third timing in the mode end period is the fade-out lighting. The operation of the vehicle cabin illumination device 24 at the fourth timing in the mode end period is return. That is, the vehicle cabin illumination device 24 returns the lighting state of the lamp 24A to the lighting state stored at the first timing in the opening period.

Operation of Embodiment

According to the embodiment described above, the execution device 41 executes the mode control program MP with reference to the mode setting value set MS. As a result, the execution device 41 executes the control of each mode in the same control flow even in the control in different modes. That is, since the information corresponding to the second mode is determined in the mode setting value set MS in addition to the information corresponding to the first mode, the control device 40 can achieve the control in the second mode different from the first mode in the same control flow as the control in the first mode.

Effect of Embodiment (1) According to the embodiment described above, the control device 40 can achieve the control in the second mode different from the first mode in the same control flow as the control in the first mode by referring to the mode setting value set MS. Therefore, the developer need solely determine the information corresponding to each mode in the mode setting value set MS when the control is executed in each of the first mode and the second mode. That is, the developer need solely determine the information corresponding to the first mode and the information corresponding to the second mode. Therefore, the developer does not have to consider the different control flows in the first mode and the second mode. As a result, the control device 40 according to the embodiment described above can suppress an excessive increase in the burden imposed on the developer, in achieving the control in the modes.

(2) According to the embodiment described above, the length of the first period is the same in the first mode and the second mode. Therefore, a timing at which the control of the second period in the first mode is started and a timing at which the control of the second period in the second mode is started are the same as each other. In this case, the developer can consider the operation content in the second period on the premise that the control is switched at the same timing in the first mode and the second mode.

(3) According to the embodiment described above, the operation contents of the first operation device are different in the first mode and the second mode, whereby different vehicle cabin environments are achieved in the first mode and the second mode. Therefore, different vehicle cabin environments can be achieved by the same operation device 20.

(4) According to the embodiment described above, the vehicle 10 can achieve a different vehicle cabin environment for the vehicle cabin environment of the vehicle 10 by operating the operation devices 20 in the modes.

(5) According to the example of the mode setting value set MS in the embodiment described above, the operation devices 20 that are the targets to be operated in the predetermined mode include the seat device 21. The seat device 21 can affect the posture of the occupant of the vehicle 10, and can give an influence that the occupant of the vehicle 10 easily feels a change among the influences due to the change in the vehicle cabin environment.

(6) According to the example of the mode setting value set MS in the embodiment described above, the operation devices 20 that are the targets to be operated in the predetermined mode include the shade device 22. The shade device 22 affects the brightness of the vehicle cabin environment of the vehicle 10 by preventing light from coming in the vehicle 10 from the outside in the closed state or not preventing light from coming in the vehicle 10 from the outside in the open state. The shade device 22 affects the way in which the occupant of the vehicle 10 feels the spread of the vehicle cabin environment of the vehicle 10 by executing the connection with the outside space of the vehicle 10. Further, by setting the shade device 22 as the target of the operation in addition to the seat device 21, for example, by controlling the state of the shade device 22 in conjunction with the reclining position of the seat device 21, whereby it is possible to greatly affect the way in which the occupant of the vehicle 10 feels the vehicle cabin environment.

(7) According to the example of the mode setting value set MS in the embodiment described above, the operation devices 20 that are the targets to be operated in the predetermined mode include the dimming device 23. The dimming device 23 affects the brightness of the vehicle cabin environment of the vehicle 10 by reducing the amount of light coming in the vehicle 10 from the outside in the dimming mode than in the light transmission mode, or increasing the amount of light coming in the vehicle 10 from the outside in the light transmission mode than in the dimming mode. By setting the dimming device 23 as the target of the operation in addition to the seat device 21, for example, by controlling the mode of the dimming device 23 in conjunction with the reclining position of the seat device 21, it is possible to greatly affect the way in which the occupant of the vehicle 10 feels the vehicle cabin environment.

(8) According to the example of the mode setting value set MS in the embodiment described above, the operation devices 20 that are the targets to be operated in the predetermined mode include the vehicle cabin illumination device 24. The vehicle cabin illumination device 24 affects the brightness of the vehicle cabin environment of the vehicle 10 depending on the mode of the illumination. Since the mode of the illumination can be easily set to various modes, it is easy to achieve various atmospheres by including the vehicle cabin illumination device 24 in the operation devices 20 that are the targets.

(9) According to the example of the mode setting value set MS in the embodiment described above, the operation devices 20 that are the targets to be operated in the predetermined mode include the air conditioning device 25. The air conditioning device 25 affects the temperature environment of the vehicle 10. Therefore, by including the air conditioning device 25 in the operation devices 20 that are the targets to be operated, the vehicle cabin environment of the vehicle 10 can be affected from the viewpoint of the temperature environment.

(10) According to the example of the mode setting value set MS in the embodiment described above, the operation devices 20 that are the targets to be operated in the predetermined mode include the audio device 26. The audio device 26 affects the sound environment in the vehicle cabin of the vehicle 10. Therefore, by including the audio device 26 in the operation devices 20 that are the targets to be operated, it is possible to affect the vehicle cabin environment of the vehicle 10 from the viewpoint of the sound environment.

Other Embodiments

The embodiment described above can be modified and carried out as follows. The embodiment described above and the following modification examples can be carried out in combination within a technically consistent range.

Operation Device

The configuration of the operation device 20 is not limited to the example of the embodiment described above. The operation device 20 is not limited to a mechanical operation device, and may be a device that executes an operation including an electrical and electronic operation. In addition, the operation device 20 can affect the vehicle cabin environment of the vehicle 10 as long as the operation device 20 is a device that affects the five senses of the occupant of the vehicle 10 by the operation of the operation device 20. For example, the seat device 21 may further include at least one of a footrest, an armrest, and a headrest, and may be able to control the positions of the footrest, the armrest, and the headrest.

The specific examples of the operation devices 20 are not limited to the examples of the embodiment described above. For example, the operation device 20 may be a device that affects the sense of smell of the occupant of the vehicle 10.

The operation content of the operation device 20 is not limited to the example of the embodiment described above. For example, the shade device 22 may adjust an opening degree in the open state, and the air conditioning device 25 may adjust an air blowing direction. The vehicle cabin illumination device 24 may project the animation on an inner wall of the vehicle 10, and the audio device 26 may control the volume of the audio.

Control Device

In the embodiment described above, the RAM 43 and the storage device 44 are described as separate devices in the control device 40, but the RAM 43 and the storage device 44 may be integrated. When the RAM 43 and the storage device 44 may be integrated, the storage device 44 may include a program storage area and a data storage area.

The control device 40 may be configured as a circuit (circuitry) including one or more processors that execute various types of processing in accordance with a computer program (software). The control device 40 may be configured as a circuit including one or more dedicated hardware circuits, such as an application-specific integrated circuit (ASIC), which executes at least a part of various types of processing, or a combination thereof. The processor includes a CPU and a memory, such as a RAM and a ROM. The memory stores a program code or an instruction configured to cause the CPU to execute the processing. The memory, that is, a computer-readable medium includes any usable medium accessible by a general-purpose or dedicated computer. In this regard, the same applies to the control unit in the operation device 20.

The control device 40 may start the execution of the mode control program MP regardless of the input from the mode switch 30. For example, the control device 40 may monitor the state of the vehicle 10, determine that the control in the predetermined mode is to be started when a predetermined condition is satisfied, and start the control in the predetermined mode. For example, the control device 40 may acquire a signal indicating that the mode control is executed when an ignition switch of the vehicle 10 is turned on. For example, the control device 40 may start the execution of the mode control program MP when a signal for turning on a power source of the vehicle 10 is acquired from a terminal having a digital key of the vehicle 10.

Mode

The modes may include, for example, a relax mode, an energize mode, an inspire mode, a focus mode, and a dream mode. The relax mode is a mode for setting the vehicle cabin environment of the vehicle 10 to a relaxing environment. Two or more operation devices 20 that are the targets to be operated in the relax mode may include the seat device 21, the shade device 22, the dimming device 23, the vehicle cabin illumination device 24, the air conditioning device 25, and the audio device 26. The energize mode and the inspire mode are modes for setting the vehicle cabin environment of the vehicle 10 to an environment in which the mood of the occupant is uplifted. Two or more operation devices 20 that are the targets to be operated in the energize mode and the inspire mode may include the vehicle cabin illumination device 24 and the audio device 26. The focus mode is a mode for setting the vehicle cabin environment of the vehicle 10 to a calm environment. Two or more operation devices 20 that are the targets to be operated in the focus mode may include the seat device 21, the vehicle cabin illumination device 24, and the air conditioning device 25. The dream mode is a mode for setting the vehicle cabin environment of the vehicle 10 to a resting environment. Two or more operation devices 20 that are the targets to be operated in the dream mode may include the seat device 21, the shade device 22, the dimming device 23, the vehicle cabin illumination device 24, the air conditioning device 25, and the audio device 26.

Mode Setting Value Set

The two or more operation devices 20 that are the targets to be operated in each mode may include the steering position adjustment device 27. For example, in the steering position adjustment device 27, the vehicle 10 can reduce a loss of a space that can be used by the occupant in the vicinity of the driver's seat of the vehicle 10 by setting the steering wheel 27A to a position close to a windshield of the vehicle 10. In a case where the two or more operation devices 20 that are the targets to be operated include the steering position adjustment device 27, the execution device 41 is preferably starts the mode control on the condition that the vehicle 10 is stopped. In this regard, regardless of the steering position adjustment device 27, the execution device 41 may start the mode control on the condition that the vehicle 10 is stopped.

The operation devices 20 that are the targets to be operated, in the mode setting value set MS, need not include the seat device 21. In addition, the operation devices 20 that are the targets to be operated, in the mode setting value set MS, need not include the shade device 22, the dimming device 23, the vehicle cabin illumination device 24, the air conditioning device 25, and the audio device 26.

The operation devices 20 that are the targets to be operated, in the mode setting value set MS, may include at least one of the shade device 22, the dimming device 23, the vehicle cabin illumination device 24, the air conditioning device 25, and the audio device 26, in addition to the seat device 21. In this case, the occupant of the vehicle 10 can be affected by the change in the vehicle cabin environment of the vehicle 10 by the visual, auditory, or temperature sense in addition to the getting-in posture.

In the mode setting value set MS, the information corresponding to the first mode may be the same information as the information corresponding to the second mode as long as a part of the information is different. For example, even when all the operation contents of the operation devices 20 that are the targets in the first mode and all the operation contents of the operation devices 20 that are the targets in the second mode are the same as each other, the length of the period in the first mode and the length of the period in the second mode need solely be partially different from each other. For example, the information corresponding to the first mode may be entirely different from the information corresponding to the second mode.

The mode setting value set MS need not include the information indicating the details of the operation in each period. In this case, the operation device 20 need solely operate based on the information indicating the operation content in each period.

The information indicating the length of each period may be stored by being input from an input device (not shown) by the user of the vehicle 10 before the mode control is started. For example, the input device is a touch display provided in the vehicle 10. When the information indicating the length of the main period in the example of the embodiment described above is input by the touch display, the control device 40 need solely overwrite and store the length of the main period in the mode setting value set MS.

In the embodiment described above, the operation devices 20 that are the targets to be operated in the first mode are the same regardless of the period, but the operation devices 20 that are the targets to be operated may be different depending on the period.

The information indicating the length of each period is not limited to the value of the length. For example, the information indicating the length may be an identification number assigned for each of a plurality of predetermined periods. The information indicating the operation devices 20 that are the targets is not limited to the ID for each operation device 20. For example, the information indicating the operation devices 20 that are the targets may be an identification number assigned to each group of a predetermined number of operation devices 20.

In the embodiment described above, the mode setting value set MS includes the information indicating the details of the operation in the first period in the first mode. The execution device 41 starts the control of the first detailed operation at the first timing in the control of each period. In the embodiment described above, the first timing is set as the same timing for the operation devices 20 that are the targets, but the present disclosure is not limited thereto. Different timings may be determined for each of the two or more operation devices 20 that are the targets. In this case, even in the same mode, the timing for starting the detailed operation can be changed for each operation device 20 that is the target.

What is claimed is:

1. A control device that controls a plurality of operation devices mounted in a vehicle, the control device comprising:

a memory storing a mode setting value set that indicates, corresponding to each of a first mode and a second mode for achieving a vehicle cabin environment of the vehicle:

information indicating a length of a first period, information indicating at least two operation devices that are targets to be operated during the first period among the operation devices, the at least two operation devices each including:

a seat device; and at least one vehicle cabin environment device selected from a group of a shade device, a dimming device, a vehicle cabin illumination device, and an air conditioning device, information indicating an operation content of each operation device of the at least two operation devices that is a target to be operated during the first period, information indicating at least two operation devices that are targets to be operated during a second period following the first period among the operation devices, and information indicating an operation content of each operation device of the at least two operation devices that is a target to be operated during the second period;

information corresponding to the first mode in the mode setting value set is at least partially different from information corresponding to the second mode in the mode setting value set; and a processor programmed to:

when control is executed in the first mode, based on the information corresponding to the first mode in the mode setting value set, start first-period control of the at least two operation devices that are targets to be operated during the first period with the operation content of each operation device of the at least two operation devices that is the target to be operated during the first period, and start second-period control of the at least two operation devices that are targets to be operated during the second period with the operation content of each operation device of the at least two operation devices that is the target to be operated during the second period when the length of the first period has elapsed from the start of the control of the first period; and when control is executed in the second mode, based on the information corresponding to the second mode in the mode setting value set, start the first-period control of the at least two operation devices that are targets to be operated during the first period with the operation content of each operation device of the at least two operation devices that is the target to be operated during the first period, and start the second-period control of the at least two operation devices that are targets to be operated during the second period with the operation content of each operation device of the at least two operation devices that is the target to be operated during the second period when the length of the first period has elapsed from the start of the control of the first period.

2. The control device according to claim 1, wherein the length of the first period indicated by the information corresponding to the first mode in the mode setting value set is the same as the length of the first period indicated by the information corresponding to the second mode in the mode setting value set.

3. The control device according to claim 1, wherein:

the at least two operation devices that are targets to be operated during the first period indicated by the information corresponding to the first mode in the mode setting value set include a first operation device;

the at least two operation devices that are targets to be operated during the first period indicated by the information corresponding to the second mode in the mode setting value set include the first operation device; and an operation content of the first operation device indicated by the information corresponding to the first mode in the mode setting value set is different from an operation content of the first operation device indicated by the information corresponding to the second mode in the mode setting value set.

4. A vehicle comprising:

a plurality of operation devices; and a control device configured to control the operation devices, wherein:

the control device includes a memory and a processor;

the memory storing a mode setting value set that indicates, corresponding to each of a first mode and a second mode for achieving a vehicle cabin environment of the vehicle, information indicating a length of a first period, information indicating at least two operation devices that are targets to be operated during the first period among the operation devices, the at least two operation devices each including:

a seat device; and at least one vehicle cabin environment device selected from a group of a shade device, a dimming device, a vehicle cabin illumination device, and an air conditioning device, information indicating an operation content of each operation device of the at least two operation devices that is a target to be operated during the first period, information indicating at least two operation devices that are targets to be operated during a second period following the first period among the operation devices, and information indicating an operation content of each operation device of the at least two operation devices that is a target to be operated during the second period;

the processor is programmed to when control is executed in the first mode, based on information corresponding to the first mode in the mode setting value set, start first-period control of the at least two operation devices that are targets to be operated during the first period with the operation content of each operation device of the at least two operation devices that is a target to be operated during the first period, and start second-period control of the at least two operation devices that are targets to be operated during the second period with the operation content of each operation device of the at least two operation devices that is the target to be operated during the second period when the length of the first period has elapsed from the start of the control of the first period;

when control is executed in the second mode, based on information corresponding to the second mode in the mode setting value set, start the first-period control of the at least two operation devices that are targets to be operated during the first period with the operation content of each operation device of the at least two operation devices that is the target to be operated during the first period, and start the second-period control of the at least two operation devices that are targets to be operated during the second period with the operation content of each operation device of the at least two operation devices that is the target to be operated during the second period when the length of the first period has elapsed from the start of the control of the first period; and the information corresponding to the first mode in the mode setting value set is at least partially different from the information corresponding to the second mode in the mode setting value set.

5. The vehicle according to claim 4, wherein the operation devices that are targets to be operated based on the mode setting value set, include a seat device.

6. The vehicle according to claim 5, wherein the operation devices that are targets to be operated based on the mode setting value set, include an audio device.

* * * * *